US006969858B2

United States Patent
Clark

(10) Patent No.: US 6,969,858 B2
(45) Date of Patent: Nov. 29, 2005

(54) OPTICAL SPATIAL INTERCONNECT NET

(75) Inventor: Stewart A. Clark, Newport Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 150 days.

(21) Appl. No.: 10/278,705

(22) Filed: Oct. 22, 2002

(65) Prior Publication Data

US 2004/0075057 A1 Apr. 22, 2004

(51) Int. Cl.⁷ .............................................. G01J 5/02
(52) U.S. Cl. ...................... 250/348; 250/332; 359/196; 398/121
(58) Field of Search ................................ 250/332, 348, 250/347, 349, 353; 359/196, 197, 209, 212, 359/230; 398/121

(56) References Cited

U.S. PATENT DOCUMENTS

| | | | |
|---|---|---|---|
| 4,675,532 A * | 6/1987 | Carson | 348/294 |
| 5,175,432 A * | 12/1992 | Reitman et al. | 250/332 |
| 5,276,319 A * | 1/1994 | Hepfer et al. | 250/208.1 |
| 5,617,318 A * | 4/1997 | Clark | 700/90 |
| 5,717,208 A * | 2/1998 | Woolaway, II | 250/332 |
| 5,721,427 A * | 2/1998 | White et al. | 250/252.1 |
| 6,018,162 A * | 1/2000 | Herbst et al. | 250/332 |
| 6,184,527 B1 * | 2/2001 | Young | 250/332 |

* cited by examiner

Primary Examiner—Albert Gagliardi
(74) Attorney, Agent, or Firm—Stetina Brunda Garred & Brucker

(57) ABSTRACT

An infrared detection system for seeing multiple pixel scenes and/or connecting multiple detectors, within each communications path, includes a data processor, optical toggles and/or electrical switches, and a large number of pixels and detectors. For the spatial net, the data processor sends signals to the optical toggle and electric switches connecting neighboring pixels and other detector elements to the data processor. A single communications path serves several pixels and detector elements thereby minimizing interconnection congestion from the pixels to the processing circuitry.

2 Claims, 4 Drawing Sheets

OPTICAL SPATIAL INTERCONNECT NET

FIELD OF THE INVENTION

The present invention relates generally to data communications between an array of infrared detectors and a multi-layer processing module, and more particularly to a spatial interconnect net with optical toggles to see multiple pixel scenes and electrical switches to connect multiple detectors within each communications path.

BACKGROUND OF THE INVENTION

Space-based surveillance systems use infrared detectors coupled to computerized data processors for monitoring heated objects and their movements in the atmosphere below and on the ground. The infrared spectrum covers a wide range of wavelengths, from about 0.75 micrometers to 1 millimeter. The function of infrared detectors is to respond to energy of a wavelength within some particular portion of the infrared region. Heated objects will dissipate thermal energy having characteristic wavelengths within the infrared spectrum. Different levels of thermal energy, corresponding to different sources of heat, are characterized by the emission of signals within different portions of the infrared frequency spectrum. Detectors are selected in accordance with their sensitivity in the range of interest to the designer. Similarly, electronic circuitry that receives and processes the signals from the infrared detectors is also selected in view of the intended detection function.

Current infrared detection systems incorporate arrays of large numbers of discrete, highly sensitive detector elements the outputs of which are connected to sophisticated processing circuitry. By rapidly analyzing the pattern and sequence of detector element excitations, the system circuitry can identify and monitor sources of infrared radiation. The outputs of the detectors must undergo a series of processing steps in order to permit derivation of the desired information. The more fundamental processing steps include preamplification, tuned bandpass filtering, clutter and background rejection, multiplexing and fixed noise pattern suppression. By providing a detector connecting module that performs at least a portion of the signal processing functions within the module, i.e. on integrated circuit chips disposed adjacent the detector focal plane, the signal from each detector need be transmitted only a short distance before processing. As a consequence of such on-focal plane or "up front" signal processing, reductions in size, power and cost of the main processor may be achieved.

Up front signal processing also helps alleviate performance and reliability problems associated with manufacturing high packing density electronics assemblies. An important part of the up front data processing are temporal net and spatial nets for filtering the data and discarding false readings. Temporal nets simply compare the present frame of data in time to each of multiple past frames of data. More problematic, is setting up a spatial net to compare values from neighboring detector elements. Multiple paths of communication from each of the detector elements to several locations on the processing circuitry are difficult, especially if the several locations are on multiple chips in a multi-layer stack. A high number of criss-crossing electrical connections may also develop an electrical magnetic field that interferes with data transmission. It is desirable to provide a spatial net that accomplishes the necessary interconnects, while minimizing the complexity of the communication paths.

The prior art has attacked this problem by providing increasing numbers of miniaturized solder contacts on the edge of the chip stack through electron-beam lithography. Also, "optronic" components are under development that will provide for optical interconnections, but the level of miniaturization attained is not yet comparable to electronic components. Methods are needed with available technology that reduce the complexity of the interconnections.

SUMMARY OF THE INVENTION

The present invention specifically addresses and alleviates the above-mentioned deficiencies associated with the prior art. The present invention generally comprises the reading of multiple pixel scenes and connecting of multiple detector elements within a single communications path to a data processor. The data processor controls a number of optical toggles and electrical switches of the interconnect net and analyzes the detector data.

More particularly, the optical spatial interconnect net of the present invention may include optical toggles which move the optical communication path from one pixel scene to another upon command of the data processor. The interconnect net may further include electric switches which alternate the communication path from one detector element to another upon command of the data processor. This architecture provides a single communications path operative to alternately receive signals from a plurality of detector elements. This architecture further provides a single communications path operative to alternately relay data from a plurality of detector elements to the data processor. The number of interconnections that must be made to view the multiple pixel scenes and the arrays of infrared detectors to the data processors are minimized.

A communication path to a selected detector element is set up by first sending a signal from the data processor to an optical toggle, moving the toggle to put a pixel of the pixel scene in optical communication with a detector element. Then, closing a switch completes the electronic circuit between the detector element and the data processor, sending a signal to a data processor. A spatial net is provided by repeating the above steps for neighboring detector element. Repeating the above steps for other switches connected to other detector elements viewing the same pixels provides redundancy and a means of passing comparative calibration information.

These, as well as other advantages of the present invention will become more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed discussion set forth below in connection the appended drawings is intended as a description of the presently preferred embodiment of the invention, and is not intended to represent the only forms in which the present invention may be constructed or utilized. The description sets forth the functions and sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
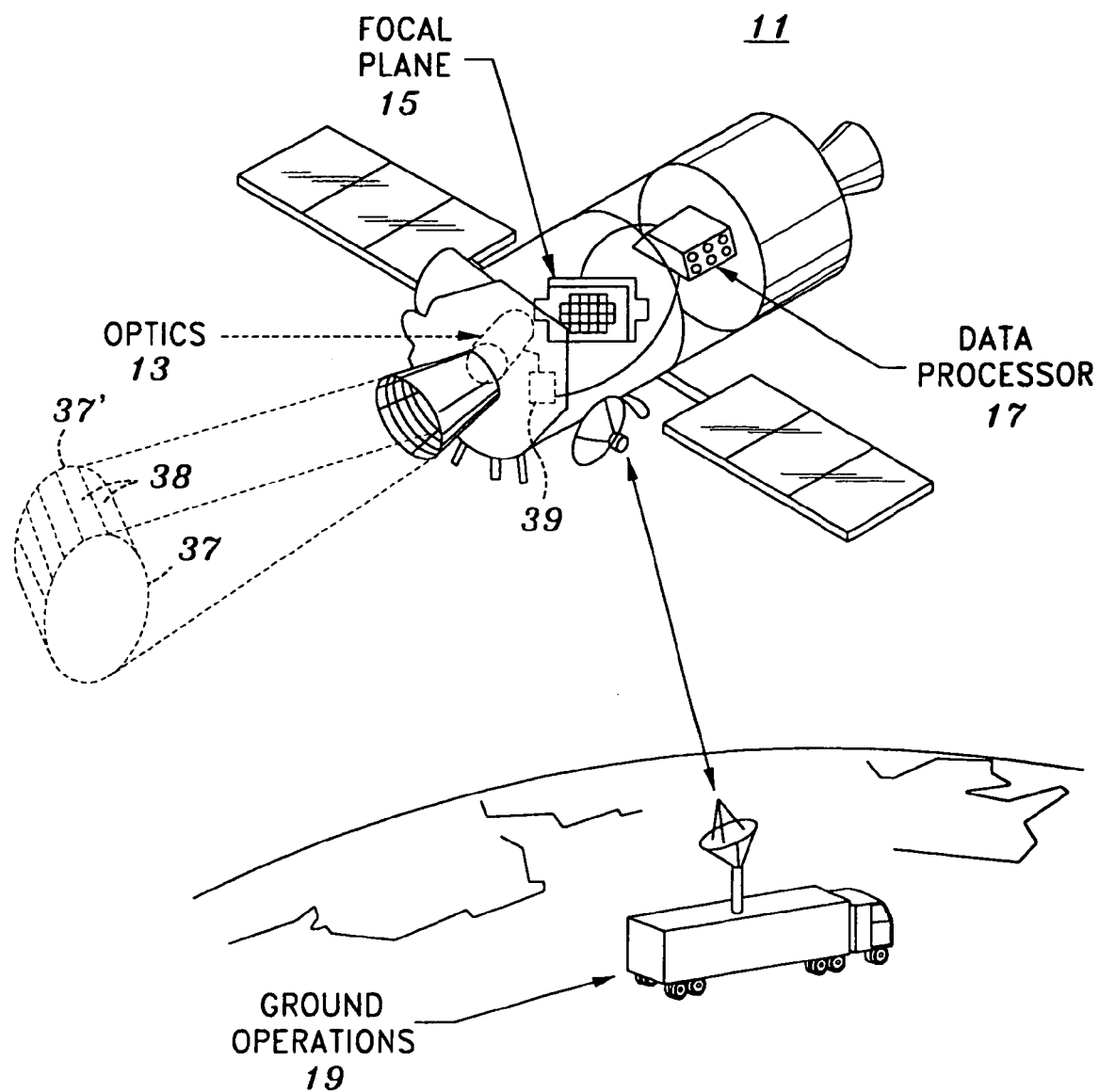
FIG. 1 is a perspective view of an infrared detector system payload disposed within an orbiting satellite.

FIG. 1 of the drawings generally illustrates an infrared detector system payload disposed within an orbiting satellite system. The satellite system generally incorporates an optical system which focuses objects within the field of view on the surface of a detector focal plane. The focal plane is formed of electro-optical components adapted to detect objects within the field of view and to generate electrical signals responsive to images of those objects. By analyzing the pattern of information produced by the individual detector elements and correlating that information over time in various ways a detailed image of the area within the field of view can be generated. The precise satellite structure, the structure of the detector modules used to form the detector focal plane, and the precise manner in which the information from the detector elements is processed is not intended to be a limitation with respect to the present invention, which, in its broader aspects, has application to all types of satellite and detector systems. Thus, the reference to particular types of detector modules is intended as exemplary of one manner in which the present invention may be utilized.

FIG. 1 more particularly illustrates a satellite 11 shown in Earth orbit. The portions of satellite 11 of interest herein include an optical system 13, detector focal plane 15 and data processor 17. The optics 13 function to image objects within the satellite field of view on the surface of the focal plane 15. The focal plane 15 may be any of a variety of constructions, utilizing a variety of different materials suitable to operate in a space environment. The focal plane 15 functions to derive electrical signals from the image focused by optical system 13 and to communicate such electrical signals to the data processor 17. The data processor 17 directs interrogation of the focal 15 and is controlled by signals from ground operations 19.

Figure 2:
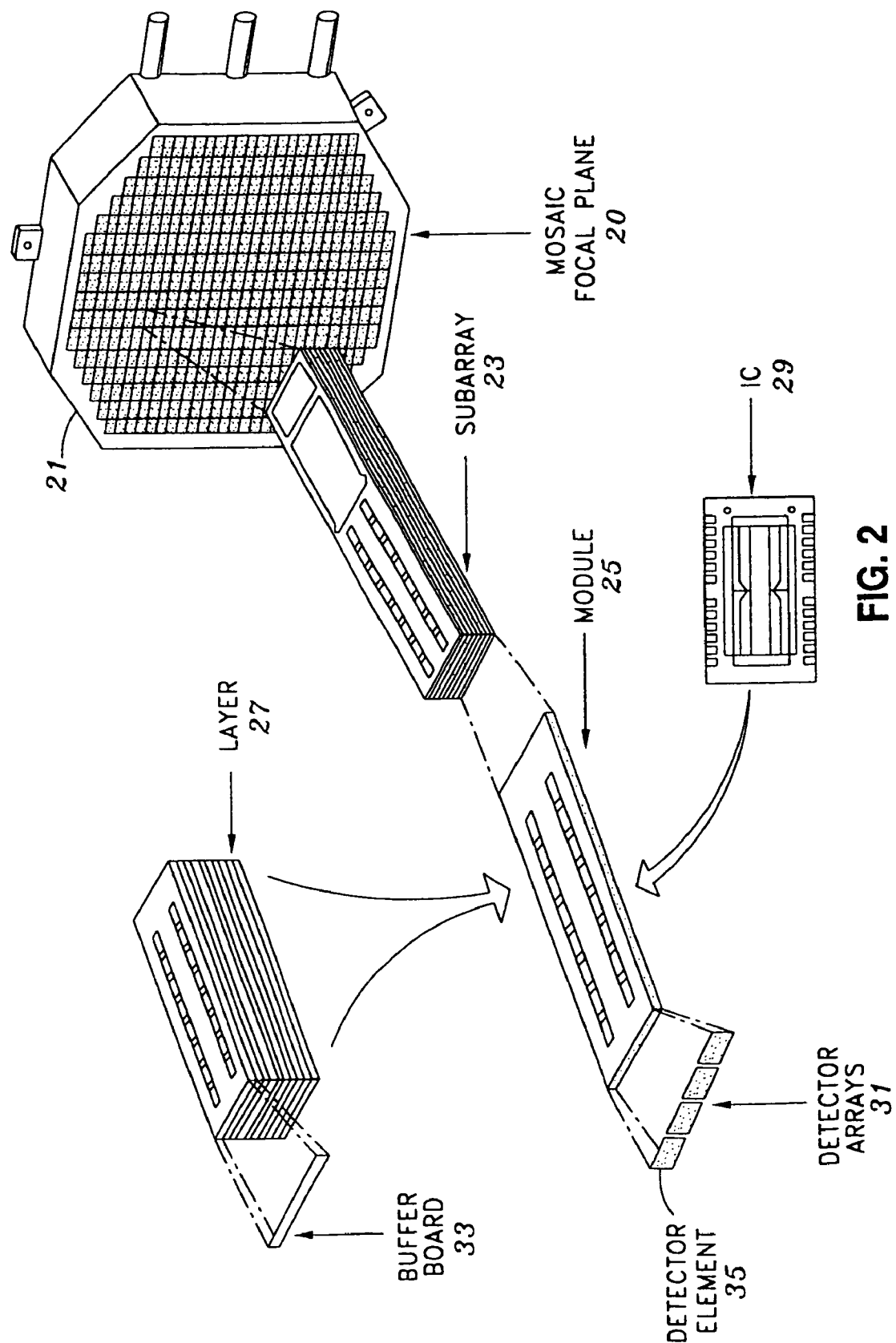
FIG. 2 is an exploded perspective view of the focal plane of the infrared detector system.

Referring to FIG. 2 a mosaic focal plane 20 useful in the application illustrated at FIG. 1 is shown in more detail. As shown at FIG. 2 the focal plane 20 is defined by a housing 21 which holds a substantial number of individual subarrays 23 disposed to have edge portions that collectively form the front face of the focal plane 20. Each subarray 23 is comprised of a plurality of modules 25, with each module 25 comprised of a plurality of separate layers 27. Integrated circuits 29 may be mounted on the layers 27 to facilitate on-focal-plane processing of data and interrogation of detector elements. Detector arrays 31, each containing a plurality of detector elements 35 are formed along a vertical edge surface of the modules. A buffer board 33 may be disposed intermediate the front face of module 25 and the detector arrays 31 to facilitate interconnection.

Each of the detector arrays 31 has a multiplicity of individual detector elements 35 for viewing each of the multiplicity of pixels 38 with in the scenes 37 in the field of view. To accomplish the up-front processing on the focal plane 15 requires a large number of electrical connections between the detector elements 35 and the multi-layer module 25. To improve the performance and reliability of the up-front processing, temporal nets and spatial nets are set up, further increasing the amount of data transmitted and the number of connections required. Also, to improve the reliability of the up-front processing, redundant connections are desirable. The temporal net (not shown) compares the present frame of data in time from detector elements 35 to each of multiple past frames. The temporal net is configured by comparing multiple analog values stored (in analog or digital form) on capacitors of the integrated circuits 29. The spatial net compares values from neighboring detector elements 35. This typically requires additional connections between the detector elements 35 and the processing circuity in the module 25.

Figure 3:
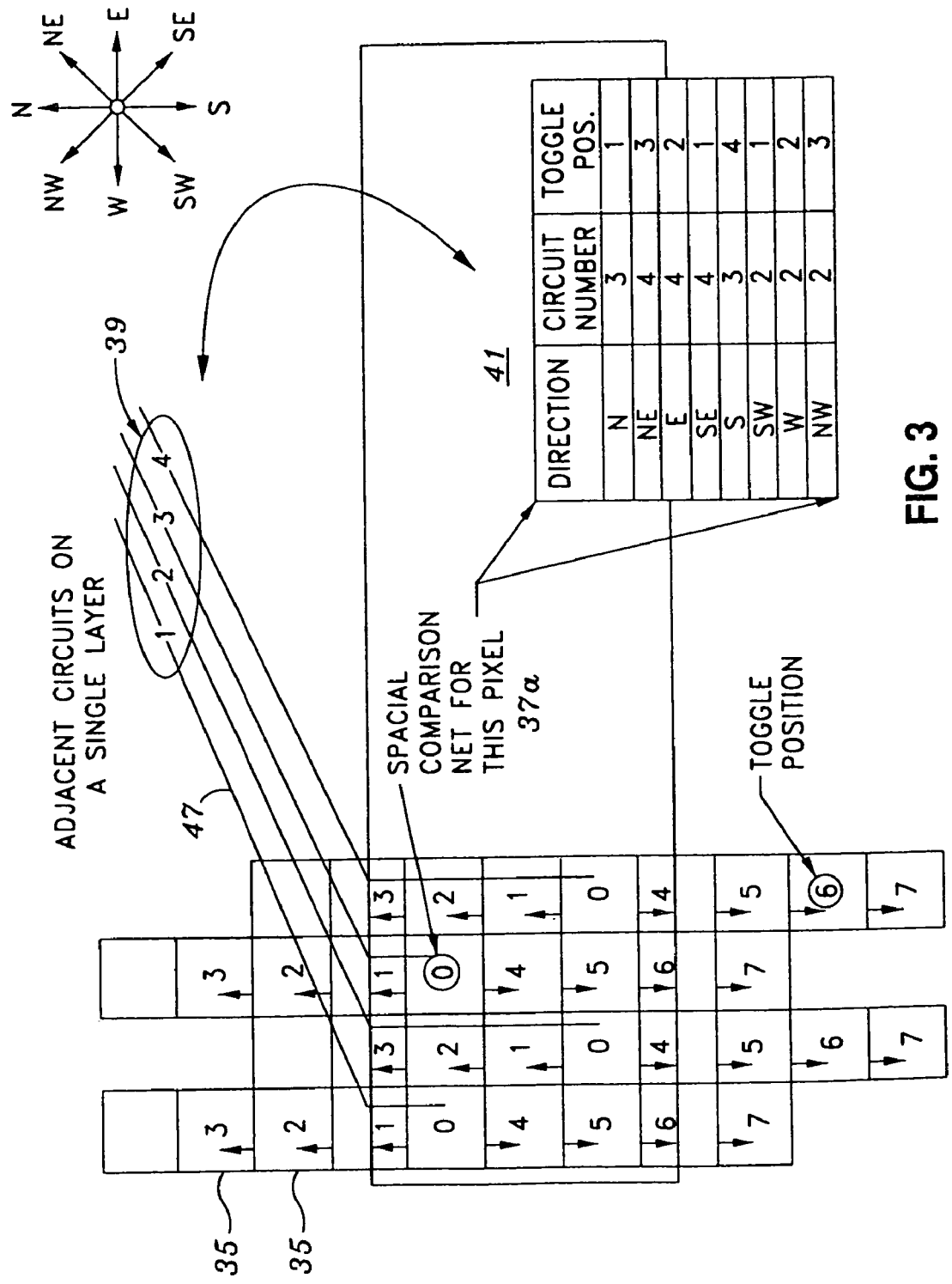
FIG. 3 is a block diagram illustrating the method of toggling connections between multiple pixels to provide spatial comparisons.
Figure 4:
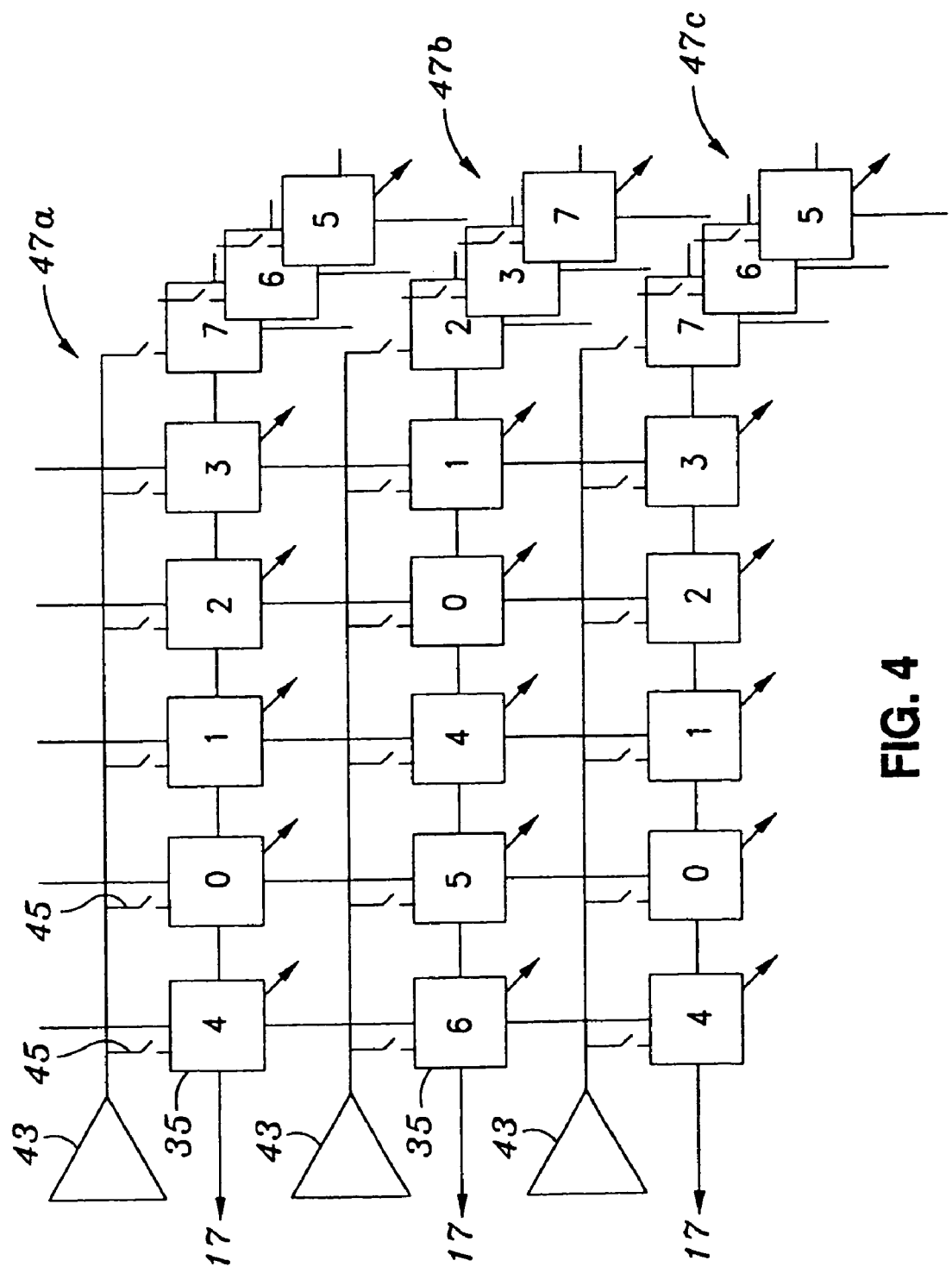
FIG. 4 is a wiring diagram of the optical spatial interconnect net of the infrared detection system.

The spatial interconnect 41 net and method of alternating communication paths between multiple pixels 38 of scenes 37 and multiple detector elements 35 of the present invention are illustrated in FIGS. 3 and 4 which depict the presently preferred embodiment of the invention.

First referring to FIGS. 1 and 3, the spatial interconnect net 41 may be further described. The preferred embodiment shows a scheme of an optical toggle 39 having multiple pixels scenes 37 within its field of view. Each detector circuit 47 is shown containing eight vertically aligned detector elements 35, though many different schemes could be set up. The spatial net 41 for a given detector element 35 is the eight surrounding detector elements, represented by the compass headings. The data processor 17 obtains a reading from a selected pixel 38 of scene 37 by designating the appropriate detector circuit 47 and optical toggle 39 position. The arrows in FIG. 3 represent tracking of a moving target either in a northerly or southerly direction.

Next referring to FIG. 4, the wiring for three detector circuits 47 of the spatial interconnect net is shown. Each of the detector circuits 47 include a connection to the data processor 17, an amplifier 43, and a switch 45. Upon the data processor 17 sending a signal to close a given switch 45, the associated detector element 35 is electrically connected to the data processor 17. The amplified signal from that detector element 35 is received at the data processor 17. The arrows in FIG. 3 represent the detectors element 35 viewing the pixels 38 of scene 37 below.

The preferred embodiment further provides that each pixel 38 of the scene 37 may be seen by two detector elements 35. This is achieved by providing overlapping coverage of the pixels 38 by the detector elements 35. Further, coverage of pixels 38 by neighboring detector elements 35 may be staggered (see FIG. 1). In this way adjacent detectors elements 35 may not cover pixels 38 within the same spatial comparison net 41.

It is understood that the optical spatial interconnect net and method for toggling viewing of pixels 38 and switching connections between multiple detectors elements 35 described herein and shown in the drawings represents only a presently preferred embodiment of the invention. Indeed, various modifications and additions may be made to the embodiment without departing from the spirit and scope of the invention. These and other modifications may be obvious to those skilled in the art and may be implemented to adapt the present invention for use in a variety of different application.

What is claimed is:

1. Apparatus for receiving data from multiple pixel scenes using a single communications path, the apparatus comprising:

a data processor;

an optical toggle in communication with the data processor;

first and second plurality of detector elements in electrical communication with the data processor;

the optical toggle being operative to image at least one pixel scene alternately upon the first and second plurality of detector elements, in response to commands from the data processor the detector elements being disposed adjacent the data processor upon a common module; and a plurality of switches, each switch being connected to an associated detector element, the switches being operative under command of the data processor to define a single communication path connecting one of a selected plurality of detector elements to the data processor.

2. The apparatus of claim 1 wherein the optical scenes imaged on the first and second plurality of the detector elements are overlapping.

* * * * *